(12) United States Patent
Berglund et al.

(10) Patent No.: US 6,544,143 B2
(45) Date of Patent: Apr. 8, 2003

(54) ENGINE BRAKE APPLICATION SYSTEM

(75) Inventors: Sixten Berglund, Torslanda (SE); Nils-Olof Håkansson, Stenkullen (SE)

(73) Assignee: Volvo Lastvagner AB, Göteborg (SE)

( * ) Notice: Subject to any disclaimer, the term of this patent is extended or adjusted under 35 U.S.C. 154(b) by 0 days.

(21) Appl. No.: 09/881,798

(22) Filed: Jun. 18, 2001

(65) Prior Publication Data

US 2002/0014220 A1 Feb. 7, 2002

Related U.S. Application Data

(63) Continuation of application No. PCT/SE99/02449, filed on Dec. 20, 1999.

(30) Foreign Application Priority Data

Dec. 18, 1998 (SE) .............................. 9804439-9

(51) Int. Cl.[7] .................................. B60K 41/04
(52) U.S. Cl. ...................... 477/107; 477/109
(58) Field of Search ................ 477/107, 109

(56) References Cited

U.S. PATENT DOCUMENTS

| | | | | |
|---|---|---|---|---|
| 3,710,908 A | * | 1/1973 | Muir | 477/107 |
| 4,787,044 A | | 11/1988 | Nagata et al. | 364/431.07 |
| 5,056,378 A | * | 10/1991 | Aimone et al. | 477/109 |
| 5,193,497 A | | 3/1993 | Hakansson | 123/90.16 |
| 5,463,995 A | * | 11/1995 | Sakai et al. | 123/432 |
| 5,553,584 A | * | 9/1996 | Konno | 123/90.16 |
| 5,609,133 A | * | 3/1997 | Hakansson | 123/321 |
| 5,947,863 A | * | 9/1999 | Grob et al. | 477/109 |
| 6,192,857 B1 | * | 2/2001 | Shimada | 477/109 |
| 6,352,061 B2 | * | 3/2002 | Takahashi | 477/107 |

FOREIGN PATENT DOCUMENTS

| | | | |
|---|---|---|---|
| EP | 0686789 A1 | 12/1995 | F16H/61/00 |
| SE | 502 154 C2 | 9/1995 | B60K/41/26 |

OTHER PUBLICATIONS

International Search Report for Application No. PCT/SE99/02449, dated Mar. 2, 2000 (mailing date).
Preliminary Examination Report for Application No. PCT/SE99/02449, dated Feb. 2, 2001 (report completion date).

* cited by examiner

Primary Examiner—Sherry Estremsky
(74) Attorney, Agent, or Firm—Howrey Simon Arnold & White LLP

(57) ABSTRACT

An engine brake application system for an internal combustion engine. The engine has at least one cylinder, at least one exhaust valve associated with the cylinder, and a rocker arm for activating the exhaust valve. The rocker arm is arranged on a hollow rocker shaft having a regulator responsive to an increase in oil pressured in the hollow rocker arm shaft and incorporated into the rocker arm for taking up clearance between the rocker arm ant the exhaust valve. To effect a reduction of engine speed during a gear shift, the system includes an actuator responsive to a signal generated in response to a need to effect a gear shift for rapidly increasing the oil pressure in the hollow rocker arm shaft to thereby effect valve clearance take-up.

21 Claims, 3 Drawing Sheets

ENGINE BRAKE APPLICATION SYSTEM

CROSS REFERENCE TO RELATED APPLICATIONS

The present application is a continuation of PCT Application No. PCT/SE99/02449, filed Dec. 20, 1999, which claims priority to Swedish Application No. 9804439-9, filed Dec. 18, 1998.

BACKGROUND OF THE INVENTION

1. Technical Field

The present invention relates to an engine brake application system for an internal combustion engine having at least one cylinder, at least one exhaust valve associated with the cylinder, and a rocker arm for activating the exhaust valve wherein the rocker arm is arranged on a hollow rocker arm shaft. The present invention further relates to a method of reducing the engine speed of an internal combustion engine during gear shifts. The invention further relates to the use of a valve clearance take-up means for effecting engine braking.

2. Background Information

Commercial vehicles such as trucks and buses are increasingly being fitted with automatic or semi-automatic gearboxes. Such gearboxes are similar to conventional manual gearboxes, with the difference being that gear shifting is performed by actuators rather than manually by the driver. Appended FIG. 1 represents the principal phases of an upshift (i.e., to a higher gear) with such a gearbox. FIG. 1 is a comparison of engine torque and engine speed with respect to time. Phase "a" represents a normal operating condition prior to instigation of a gearshift. Phase "b" represents torque removal once it has been determined that an upshift is to take place. Phase "c" represents disengagement of a dog clutch to disconnect the gearbox from the engine. Phase "d" represents reduction of engine speed to match the engine speed with the gear ratio to be selected. Once the engine speed has been reduced sufficiently, the new gear can be engaged. Thus, phase "e" represents engaging the new dog clutch. Phase "f" represents reapplication of torque and phase "g" represents a normal operating condition after the gearshift has taken place.

In order to reduce loss of momentum of the vehicle during an upshift, it is advantageous to match engine speed with the new gear ratio as quickly as possible. It is known from Swedish Patent No. 502 154 C2 to selectively apply an exhaust gas brake during an upshift when certain operating parameters are attained, thereby effecting a rapid reduction of the engine speed. In this manner, wear on the exhaust gas brake system is said to be reduced since application of the exhaust gas brake occurs only during a small fraction of the total number of upshifts.

An auxiliary braking system for commercial vehicles is known from U.S. Pat. No. 5,193,497 ("the '497 patent") in which an internal combustion engine is provided with a device for taking up valve clearance in the valve mechanism of the engine. The take-up occurs by means of an actively adjustable, hydraulically operated take-up means operable between two positions, namely a withdrawn position and an extended position. The take-up means is arranged at the operating end of the rocker arms whose valve clearance is to be taken up. In a manner described in detail in the '497 patent, the engine's existing pressurized oil system is used in order to guarantee operation of the device.

The auxiliary braking system disclosed in the '497 patent has enjoyed considerable commercial success. However, due to the relatively long time it takes for the take-up means to attain its extended position, the system taught by the '497 patent is not suitable for use for reducing engine speed during upshifts.

SUMMARY OF THE INVENTION

It is therefore an object of the present invention to provide an engine brake application system which incorporates the commercial advantages of the system described in the '497 patent, and which is also suitable for use for reducing engine speed during upshifts. This object is achieved in accordance with the present invention by an engine brake application system for an internal combustion engine. The internal combustion engine should have at least one cylinder, at least one exhaust valve associated with the cylinder, and a rocker arm for activating the exhaust valve wherein the rocker arm is arranged on a hollow rocker arm shaft. The engine brake application system has a regulator or means for regulating oil pressure in the hollow rocker arm shaft, and a means responsive to an increase in oil pressure in the hollow rocker arm shaft and incorporated in the rocker arm for taking up clearance between the rocker arm and the exhaust valve. The system is able to effect valve clearance take-up by a means that is responsive to a signal generated in response to a need to effect a gear shift for rapidly increasing the oil pressure in the hollow rocker arm shaft.

It is a further object of the invention to provide a method for reducing engine speed during upshifts. This is achieved by a method for reducing engine speed of an internal combustion engine during gear shifts. The engine has at least one cylinder, at least one exhaust valve associated with the cylinder, a rocker arm that is arranged on a hollow rocker arm shaft for activating the exhaust valve, a regulator or means for regulating oil pressure in the hollow rocker arm shaft, and an actuator or means responsive to an increase in oil pressure in the hollow rocker arm shaft and incorporated in the rocker arm for taking up clearance between the rocker arm and the exhaust valve. The method requires generating a signal in response to a need to effect a gear shift, and rapidly increasing the oil pressure in the hollow rocker arm shaft in response to the signal to thereby effect valve clearance take-up.

The signal of the above described method may be generated in an Engine Management System. Further, in the above described method, rapidly increasing the oil pressure in the hollow rocker arm shaft may be accomplished by the use of a pneumatic actuator.

The invention also provides for the use of a valve clearance take-up means in an internal combustion engine for reducing engine speed during a gear shift.

Advantageous embodiments of the invention further include a means responsive to an increase in oil pressure in the hollow rocker arm shaft and incorporated in the rocker arm for taking up clearance between the rocker arm and the exhaust valve wherein the means is a pneumatic actuator. The pneumatic actuator may be arranged to inject a volume of oil into the hollow rocker arm shaft wherein the volume of oil is equivalent to a swept volume between a withdrawn position and an extended position of a piston.

Further, the pneumatic actuator may have an oil displacement means that is displaceable between a rest position and an activated position. The oil displacement means is preferably urged towards the rest position by a return means. The oil displacement means is preferably a piston, and the return means is preferably a resilient means such as a spring. In another embodiment, the oil displacement means and return means is a flexible membrane.

The oil displacement means is able to be displaced by the system from its rest to activated position in less than about 0.8 seconds; preferably in less than about 0.5 seconds; more preferably in less than about 0.2 seconds; even more preferably in less than about 0.1 seconds; and most preferably in less than about 0.05 seconds. The oil displacement means is able to be displaced by the return means from its rest to activated position in less than about 0.8 seconds; preferably in less than about 0.5 seconds; more preferably in less than about 0.2 seconds; even more preferably in less than about 0.1 seconds; and most preferably in less than about 0.05 seconds.

BRIEF DESCRIPTION OF THE DRAWINGS

The invention will be described in greater detail in the following by way of example only and with reference to embodiments shown in the attached drawings, in which.

DETAILED DESCRIPTION OF THE INVENTION

Figure 1:
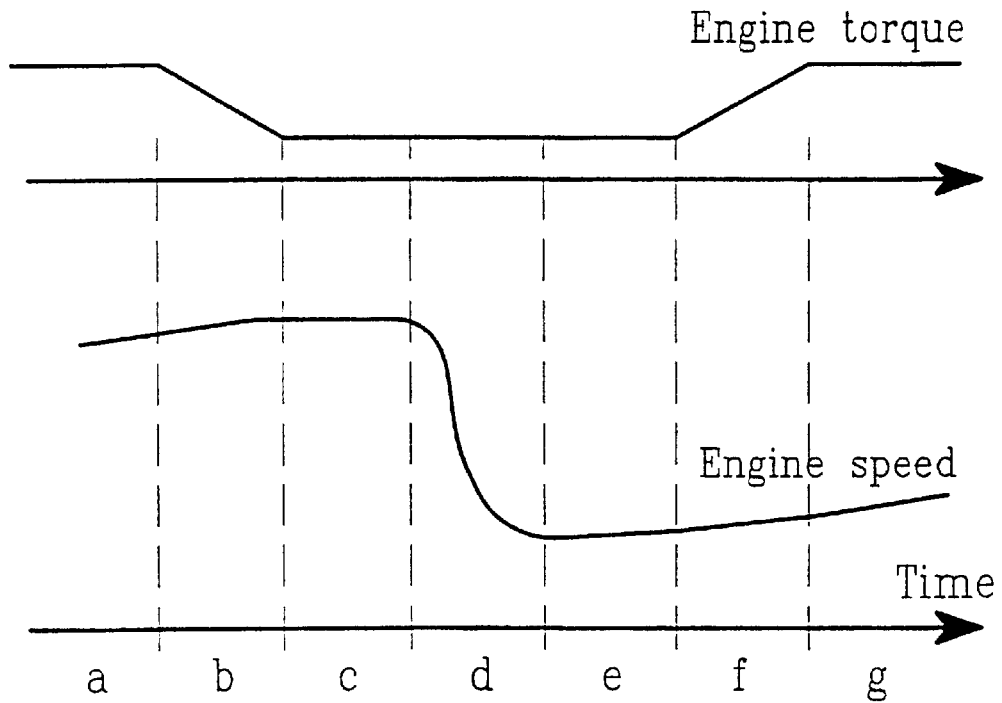
FIG. 1 is a graphical representation of the principal phases during a upshift in a gearbox.

As previously mentioned above, FIG. 1 represents the principal phases of an upshift (i.e., to a higher gear) with an automatic or semi-automatic gearbox presently used in commercial vehicles. FIG. 1 is a comparison of engine torque and engine speed with respect to time. Phase "a" represents a normal operating condition prior to instigation of a gearshift. Since phase "a" is prior to an upshift, the engine speed is normally increasing. Phase "b" represents torque removal once it has been determined that an upshift is to take place. Torque removal requires matching the rotational speeds of the output shaft from the engine and the input shaft to the gearbox. It can be effected in several ways depending on the prevailing operating conditions of the vehicle in which the gearbox is fitted. Phase "c" represents disengagement of a dog clutch for disconnecting the gearbox from the engine. During this phase, the supply of fuel to the engine is restricted to prevent the engine speed from increasing. Phase "d" represents reduction of engine speed for matching the engine speed with the gear ratio to be selected. It is the delay in reaching the desired new engine speed that primarily determines how quickly an upshift can take place. Once the engine speed has been reduced sufficiently, the new gear can be engaged. Thus, phase "e" represents engaging the new dog clutch. Phase "f" represents reapplication of torque, and phase "g" represents a normal operating condition after the gearshift has taken place.

Figure 2:
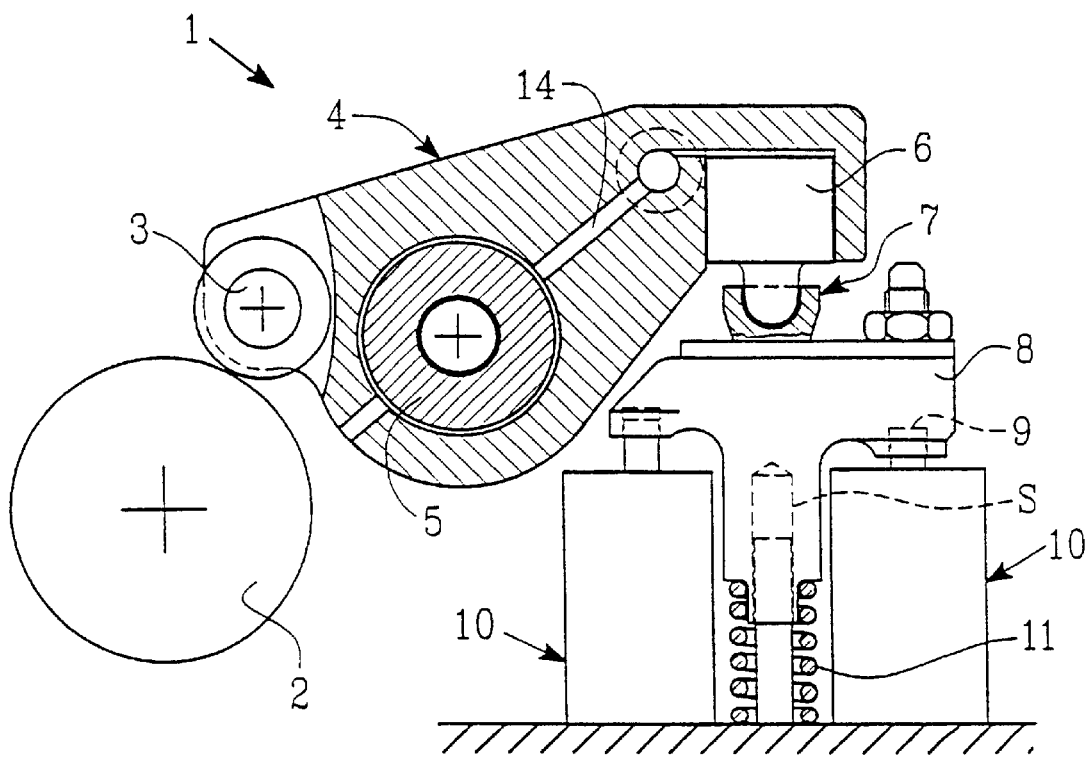
FIG. 2 is a cross-sectional representation of the valve clearance take-up device of the '497 patent.

In accordance with the present invention, reduction of engine speed under phase "d" is attained using a modified version of the valve clearance take-up mechanism disclosed in the '497 patent, the contents of which are hereby incorporated by reference. Operation of the valve clearance take-up mechanism disclosed in the document may be gleaned from FIG. 2. In the drawing, a valve mechanism 1 for an internal combustion engine is shown. The mechanism 1 includes a camshaft 2 which, via a cylindrical roller 3, transmits its rotational movement to a rocker arm 4. The rocker arm 4 is arranged on a hollow rocker arm shaft 5 that is intended to be mounted to a cylinder head (not shown) by suitable means such as bolts. Displacement of the rocker arm 4 is transmitted via means 6 and a hemispherical guide 7 to a yoke 8 which is movable up and down on a guide S in the cylinder head. In the illustrated embodiment, the yoke 8 acts on two valve stems 9. Each valve stem is surrounded in a conventional manner by a valve spring 10. In addition to both the valve springs 10, there is a spring 11 which is arranged beneath the yoke 8. The purpose of this spring is to maintain the yoke in such a position that the clearance which always arises in a valve mechanism of this type occurs between the respective valve stems 9 and the underside of the yoke 8.

Figure 3:
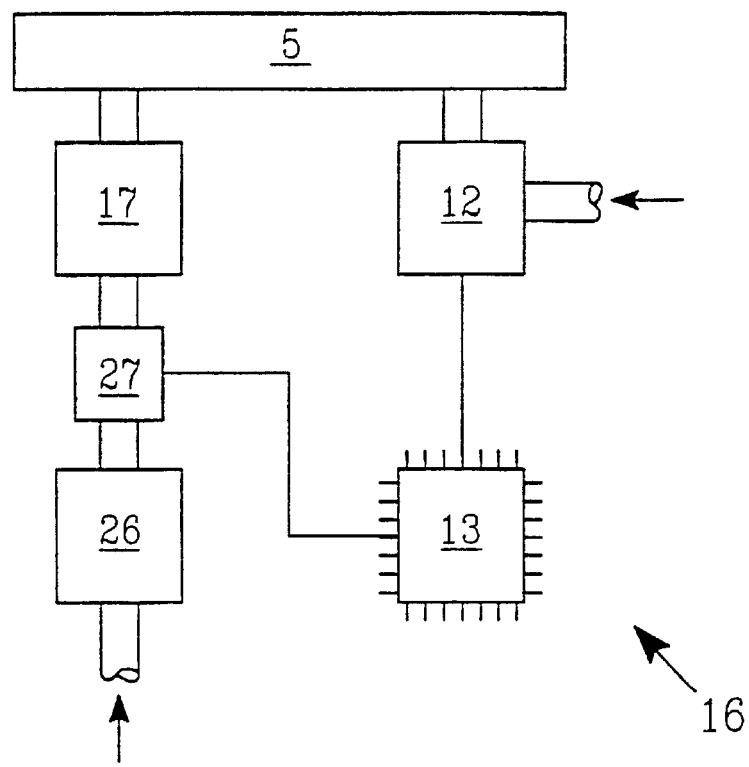
FIG. 3 is a schematic representation of the engine brake application system according to the present invention.

With reference to FIG. 3, the described valve mechanism is pressure lubricated by oil which is supplied to the hollow interior of the rocker arm shaft 5 via a pressure regulator 12. The pressure regulator is supplied with oil at a pressure of, for example, 5 bar, while the pressure of oil delivered to the rocker arm shaft is controlled by signals from an engine management system (EMS) 13. Oil returns to the engine sump as a result of leakage flow between the rocker arm shaft 5 and the various bearings. Referring back to FIG. 2, oil introduced into the rocker arm shaft 5 flows along a conduit 14 in each rocker arm 4 to act on the means 6 arranged at the end of the rocker arm above the valve stems 9. The means 6 is in the form of a piston 15 which is operable between two positions, namely a withdrawn position and an extended position. During normal operating conditions, the pressure regulator 12 supplies oil to the rocker arm shaft 5 at about 1 bar. Under such pressure conditions, the piston 15 is retained in its withdrawn position by means of the spring 11 acting on the yoke 8.

When it is desired to take up the valve clearance, i.e., when auxiliary braking is required, the EMS 13 instructs the pressure regulator 12 to supply oil to the rocker arm shaft 5 at an increased pressure of, for example, 2 bar. Build-up of oil pressure adjacent the piston 15 in the rocker arm 4 causes displacement of the piston through a swept volume to its extended position. In its extended position, the piston 15 reduces the valve clearance in such a manner that the rocker arm 4 is actuated by small lobes (not shown) on the camshaft 2. This implies that the exhaust valves can be operated to obtain negative work from the engine, i.e., an engine braking effect.

While the above-described system does offer a certain amount of engine braking, it takes too long for the piston to reach its extended position for the system to be used as an engine brake application system during gear shifting. Thus, in accordance with the present invention, the rocker arm shaft 5 cooperates with means 16 responsive to a signal generated in response to a need to effect a gear shift for rapidly increasing the oil pressure in the hollow rocker arm shaft 5 to thereby effect valve clearance take up.

The expression "rapidly increasing the oil pressure" means that the oil pressure in the hollow rocker arm must be increased sufficiently quickly for the valve clearance take-up to be attained such that a discernable amount of engine braking is obtained during phase "d" of FIG. 1. It will be apparent to the skilled person that the actual rate of increase of pressure will depend, e.g., on the viscosity of the oil, the number of rocker arms equipped with the valve clearance take-up means, etc.

The means 16 is responsive to a signal generated in response to a need to effect a gear shift. The means 16 rapidly increases oil pressure in the hollow rocker arm shaft 5 thereby effecting valve clearance take up. The means 16 preferably comprises a pneumatic actuator. The pneumatic actuator is arranged to inject a volume of oil into the hollow rocker arm shaft 5, with the volume of oil corresponding substantially to the swept volume through which the piston 15 (or pistons if a plurality of rocker arms are provided with valve clearance take-up means) is displaced when effecting valve clearance take-up. In a typical application, the volume of oil may be about 1 dl.

Figure 4:
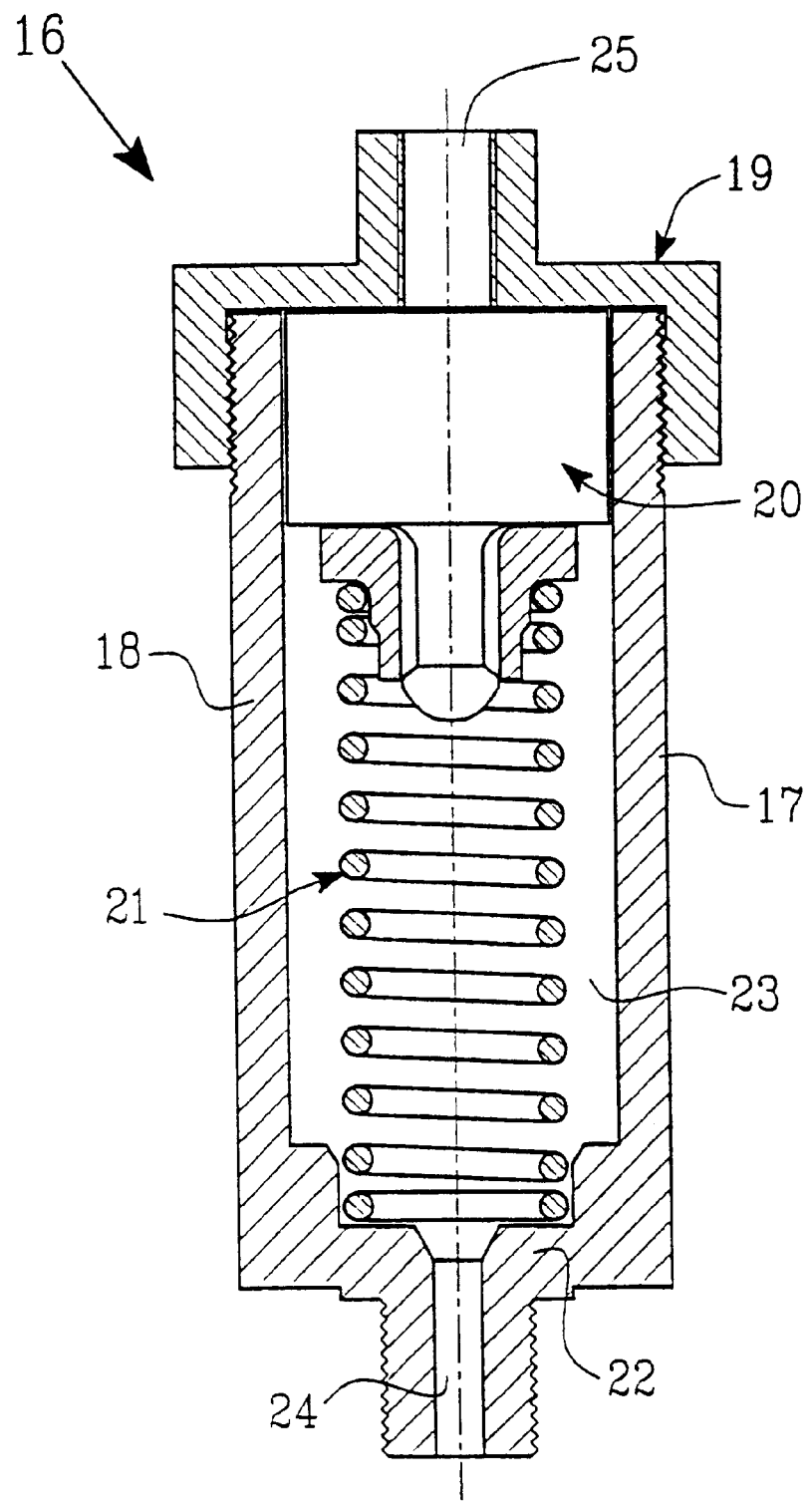
FIG. 4 is a cross-sectional view of a first embodiment of a pneumatic actuator for use in the system of FIG. 3.

Thus, one embodiment of a pneumatic actuator suitable for use in the system of the present invention is illustrated in FIG. 4. The pneumatic actuator 17 comprises a generally cylindrical housing 18 closed at one end by an end cap 19. An oil displacement means in the form of a piston 20 is displaceable within the cylindrical housing 18 between a rest position and an activated position. The piston 20 is urged towards the rest position by a return means that may be in the form of a resilient means such as a helical spring 21 acting on an end wall 22 of the cylindrical housing opposite the end cap 19. Accordingly, the spring 21 is accommodated in a chamber 23 delimited in part by the cylindrical housing 18, the piston 20 and the end wall 22. It is to be understood, however, that the return means may comprise any means which will ensure a rapid return of the oil displacement means from its activated position to its rest position. Such means can, for example, include compressed air. The end wall 22 is provided with a through opening 24 such that the chamber 23 communicates with the inside of the hollow rocker arm shaft 5. Thus, the chamber 23 is filled with oil.

The end cap 19 is provided with a through opening 25 which selectively communicates with a high pressure pneumatic source, for example, the pressurized air system of the vehicle to which the engine brake application system is fitted. As shown in FIG. 3, the pneumatic source may be an air accumulator 26 which is supplied with air at, for example, 8 bar. The air accumulator 26 is separated from the pneumatic actuator 17 by a suitable electrically triggered valve means 27. The valve means 27 is arranged to connect the through opening 25 of the actuator 17 to the air accumulator 26 upon receipt of a signal from the EMS 13 that engine braking is required during an upshift.

Figure 5:
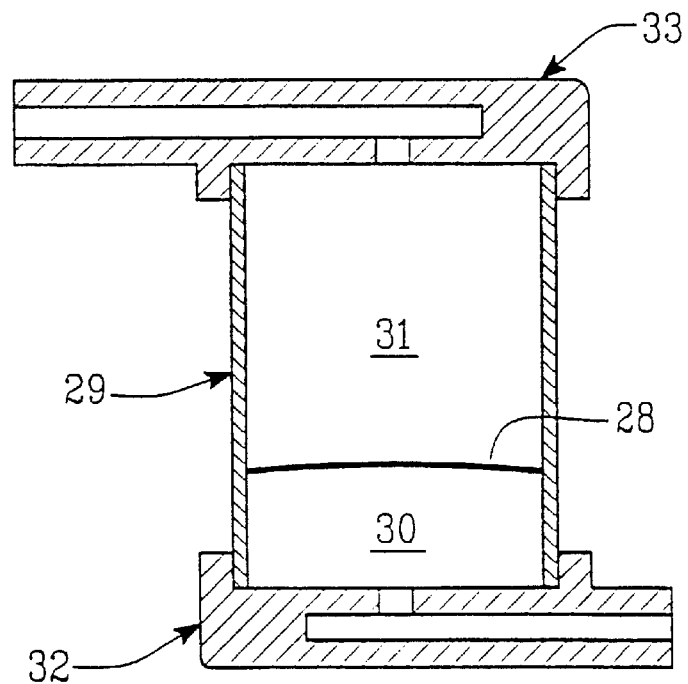
FIG. 5 is a cross-sectional view of a second embodiment of a pneumatic actuator for use in the system of FIG. 3.

In an alternative embodiment of a pneumatic actuator shown in FIG. 5, a flexible membrane 28 is used as oil displacement means. Thus, the flexible membrane is affixed within a cylindrical housing 29 to thereby partially define an air chamber 30 and an oil chamber 31. The air chamber communicates via a first end cap 32 with a high pressure pneumatic source, while the oil chamber 31 communicates with the interior of the hollow rocker arm shaft 5 via a second end cap 33. The high pressure pneumatic source may by any of those described with relation to the embodiment shown in FIG. 4. The membrane 28 may be made of any suitably resilient material, preferably a polymer. Application of air pressure in the air chamber 30 causes the membrane 28 to displace oil out of the oil chamber 31 and into the hollow rocker arm shaft 5. Depending on the material properties of the membrane 28, its natural resiliency may make a return spring superfluous. Thus, the membrane 28 may also serve as a return means.

Regardless of the oil displacement means, the system is preferably adapted to displace the oil displacement means from its rest position to its activated position in no more than about 0.8 seconds. Preferably, this time interval should be less than about 0.5 seconds, preferably less than about 0.2 seconds, for example, 0.1 seconds, and most preferably about 0.05 seconds. Furthermore, the return means should be adapted to displace the oil displacement means from its activated position to its rest position in a similar time interval. In this manner, sufficiently quick activation and deactivation of the engine brake application system for useful engine braking during upshifting is ensured.

The system according to the present invention functions in the following manner. During normal operation of the vehicle oil is supplied to the hollow rocker arm shaft 5 at about 1 bar, and the piston 15 in each rocker arm 4 is in its withdrawn position. When auxiliary braking is desired the EMS 13 instructs the pressure regulator 12 to supply oil to the hollow rocker arm shaft 5 at a pressure of about 2 bar. As previously explained, this increase in pressure causes the piston 15 to gradually approach its extended position at which valve clearance is taken up.

During normal operation of the vehicle, when the EMS 13 determines that an upshift is to occur and engine brake application is necessary for expediting the upshift, the EMS instructs the pressure regulator 12 to increase the pressure of oil supplied to the hollow rocker arm shaft 5 as when normal auxiliary braking is required. In addition, the EMS 13 signals the electrically triggered valve means 27 to open. Compressed air is then able to rapidly flow into the pneumatic actuator to effect displacement of the oil displacement means, be it a piston or a membrane. A volume of oil is thereby rapidly injected into the hollow rocker arm shaft, causing the piston 15 at the end of each rocker arm to virtually spontaneously adopt its extended position, thereby taking up the valve clearance. Once the engine speed has been synchronized with the gear ratio to be engaged, the valve means 27 is instructed by the EMS 13 to connect the air side of the pneumatic actuator to atmosphere, thereby allowing the oil displacement means to return to its rest position. This return displacement rapidly reduces the oil pressure in the hollow rocker arm shaft 5 such that the piston 15 in each rocker arm is rapidly drawn back to its withdrawn position. Hence engine braking ceases and torque can be re-applied without undue delay, thereby maintaining the momentum of the vehicle.

In one embodiment, the air accumulator 26 may be replaced by a direct connection to the compressed air system of the vehicle.

The invention is not restricted to the embodiments described above and shown in the drawings, but may be varied within the scope of the appended claims.

What is claimed is:

1. An engine brake application system for an internal combustion engine, said engine brake application system comprising:
    an engine having at least one cylinder, at least on exhaust valve associated with said cylinder, and a rocker arm for activating said exhaust valve, said rocker arm being arranged on a hollow rocker arm shaft;
    means for regulating oil pressure in said hollow rocker arm shaft;
    means responsive to an increase in oil pressure in said hollow rocker arm shaft and incorporated in said rocker arm for taking up clearance between said rocker arm and said exhaust valve; and
    means responsive to a signal that is generated in response to a need to effect a gear shift for rapidly increasing said oil pressure in said hollow rocker arm shaft, thereby effecting valve clearance take-up.

2. The system as claimed in claim 1 wherein said means responsive to a signal generated in response to a need to effect a gear shift for rapidly increasing said oil pressure in said hollow rocker arm shaft comprises a pneumatic actuator.

3. The system as claimed in claim 2 wherein said means responsive to an increase in oil pressure for taking up clearance between said rocker arm and said exhaust valve comprise a piston arranged for displacement through a swept volume between a withdrawn position and an extended position, wherein said pneumatic actuator is arranged to inject a volume of oil into said hollow rocker arm shaft, said volume of oil corresponding substantially to said swept volume.

4. The system as claimed in claim 2 wherein said pneumatic actuator comprises an oil displacement means displaceable between a rest position and an activated position, said oil displacement means being urged towards said rest position by return means.

5. The system as claimed in claim 4 wherein said oil displacement means is a piston and said return means is a resilient means.

6. The system as claimed in claim 5 wherein said resilient means is a spring.

7. The system as claimed in claim 4 wherein said oil displacement means and said return means is a flexible membrane.

8. The system as claimed in claim 4 wherein system is adapted to displace said oil displacement means from its rest position to its activated position in less than about 0.8 seconds.

9. The system as claimed in claim 8 wherein system is adapted to displace said oil displacement means from its rest position to its activated position in less than about 0.5 seconds.

10. The system as claimed in claim 9 wherein system is adapted to displace said oil displacement means from its rest position to its activated position in less than about 0.2 seconds.

11. The system as claimed in claim 10 wherein system is adapted to displace said oil displacement means from its rest position to its activated position in less than about 0.1 seconds.

12. The system as claimed in claim 11 wherein system is adapted to displace said oil displacement means from its rest position to its activated position in less than about 0.05 seconds.

13. The system as claimed in claim 4 wherein said return means is adapted to displace said oil displacement means from its activated position to its rest position in less than about 0.8 seconds.

14. The system as claimed in claim 13 wherein said return means is adapted to displace said oil displacement means from its rest position to its activated position in less than about 0.5 seconds.

15. The system as claimed in claim 14 wherein said return means is adapted to displace said oil displacement means from its rest position to its activated position in less than about 0.2 seconds.

16. The system as claimed in claim 15 wherein said return means is adapted to displace said oil displacement means from its rest position to its activated position in less than about 0.1 seconds.

17. The system as claimed in claim 16 wherein said return means is adapted to displace said oil displacement means from its rest position to its activated position in less than about 0.05 seconds.

18. Use of valve clearance take-up for reducing engine speed during a gear shift in an internal combustion engine in a system as claimed in claim 1.

19. A method for reducing engine speed of an internal combustion engine during gear shifts, said engine comprising at least one cylinder, at least one exhaust valve associated with said cylinder, a rocker arm for activating said exhaust valve, said rocker arm being arranged on a hollow rocker arm shaft, means for regulating oil pressure in said hollow rocker arm shaft and means responsive to an increase in oil pressure in said hollow rocker arm shaft and incorporated in said rocker arm for taking up clearance between said rocker arm and said exhaust valve, said method comprising the steps of:

generating a signal in response to a need to effect a gear shift, and rapidly increasing said oil pressure in said hollow rocker arm shaft in response to said signal to thereby effect valve clearance take-up.

20. The method of claim 19 wherein said signal is generated in an Engine Management System.

21. The method of claim 19 wherein said step of rapidly increasing said oil pressure in said hollow rocker arm shaft is achieved using a pneumatic actuator.

* * * * *